(12) United States Patent
Campbell et al.

(10) Patent No.: US 7,891,849 B2
(45) Date of Patent: Feb. 22, 2011

(54) LIGHT EMITTING HAND GRIP, FOOT PEG OR FOOT REST FOR A CYCLE

(76) Inventors: James O'Dell Campbell, 2673 Kiball Dr., San Jose, CA (US) 95121; Anthony J. Quartaro, 878 San Junipero Dr., Sunnyvale, CA (US) 94085

( * ) Notice: Subject to any disclaimer, the term of this patent is extended or adjusted under 35 U.S.C. 154(b) by 235 days.

(21) Appl. No.: 12/215,623

(22) Filed: Jun. 27, 2008

(65) Prior Publication Data

US 2009/0323368 A1    Dec. 31, 2009

(51) Int. Cl.
*B62J 6/00*    (2006.01)
*F21V 33/00*    (2006.01)

(52) U.S. Cl. .......... 362/474; 362/473; 362/551; 362/577

(58) Field of Classification Search .......... 362/473, 362/551, 555, 577, 474; 74/551.8; 340/432
See application file for complete search history.

(56) References Cited

U.S. PATENT DOCUMENTS

| | | | |
|---|---|---|---|
| 2,416,160 A | 12/1944 | Davidsson | |
| 2,603,701 A | 2/1951 | Schadel, Jr. | |
| 2,793,284 A | 7/1954 | Simoneit | |
| 4,656,564 A | 4/1987 | Felder | |
| 4,716,502 A | 12/1987 | Schott et al. | |
| 4,779,169 A | 10/1988 | Cruze | |
| 5,247,431 A | 9/1993 | Liu | |
| 5,662,405 A * | 9/1997 | Kuo | 362/473 |
| 5,702,172 A * | 12/1997 | Kilburn | 362/473 |
| 5,902,038 A * | 5/1999 | Curry | 362/473 |
| 6,196,707 B1 * | 3/2001 | Deckard | 362/473 |
| 6,308,590 B1 | 10/2001 | Berto | |
| 6,398,393 B1 * | 6/2002 | Perse | 362/473 |
| 6,454,445 B1 * | 9/2002 | Liaw et al. | 362/473 |
| 2003/0095414 A1 * | 5/2003 | Tracey | 362/473 |

\* cited by examiner

*Primary Examiner*—Sandra L O Shea
*Assistant Examiner*—Danielle Allen
(74) *Attorney, Agent, or Firm*—Clifford A. Poff; Suzanne Kikel

(57) ABSTRACT

A light emitting assembly to form a handgrip, a foot peg or a footrest in a cycle contains an elongated sleeve concentrically supported on a light conductive base illuminated by light emitting diode on a circuit board or embedded in the base. An end cap is used to mount the circuit board to an outboard end of the base which is cylindrical and supports a sleeve. The sleeve has light emitting openings and the end cap has a light diffusing lens containing decorative openings illuminated by the diodes. The inboard end of the sleeve contains a light emitting radial wall forming part of the decorative display.

12 Claims, 9 Drawing Sheets

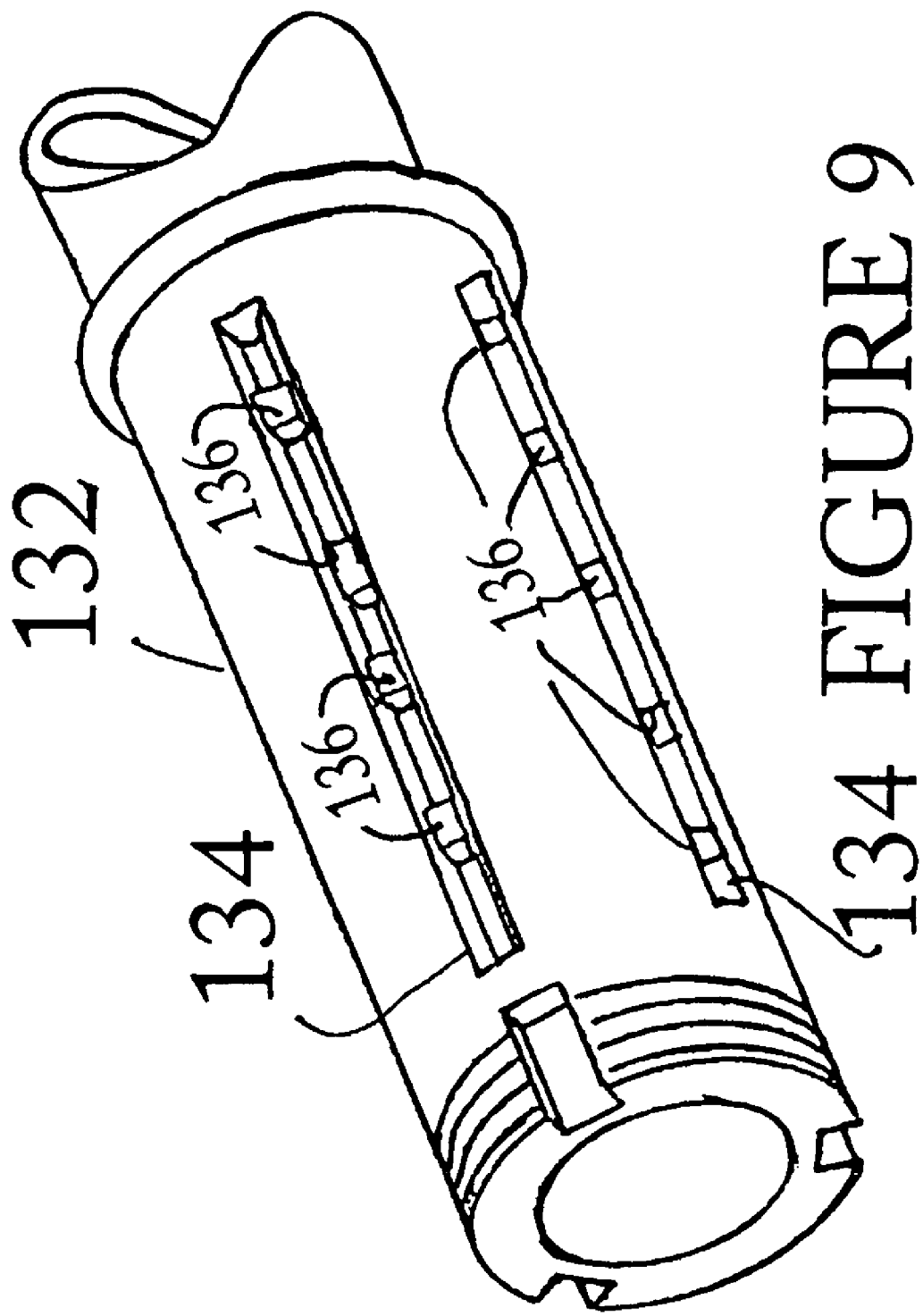

LIGHT EMITTING HAND GRIP, FOOT PEG OR FOOT REST FOR A CYCLE

CROSS-REFERENCE TO RELATED APPLICATIONS

Not Applicable

BACKGROUND OF THE INVENTION

The present invention provides distinctive and identifiable sources of illumination to indicate the presence of a cycle particularly on a roadway and, more particularly, to such a source of illumination for selective addition at any of diverse sites about each of opposite sides of a cycle.

As disclosed in U.S. Pat. Nos. 2,416,160; 2,603,701; 2,793,284; 4,656,564; 4,716,502; 4,779,169; 5,247,431; and 6,308,590 it is well known in the art to provide a light source at each end of a handle bar. The light source takes the form of an incandescent light bulb or a light emitting diode and is selectively connected to an electrical power supply located either externally of the handle bar or within terminal end parts. A lens usually forms a closure to the hollows of the handle bar for diffusing the light produced by the light source. The single light beam from each of the ends of the handle bars is non-distinctive and incapable of imparting decorative aesthetics.

Accordingly, it is an object of the present invention to provide a hand grip and foot peg/rest assembly having a constructions of parts to allow a unique interchangeability of numerous sleeves with decorative shaped opening to emit light for a unique appearance.

It is a further object of the present invention to provide a hand grip universally applied and installed on cycles which include motorcycles, scooters and other vehicle using a handle bar and may or may not include foot pegs or foot rests.

It is another object of the present invention to provide a construction for hand grips to allow the creation of customized appearances by installing a select sleeve that has any one or more of a desired shape different shapes, numbers, letters, designs, lights, multi media materials and can be made of any one of plastic, glass, ceramic, carbon fiber or rubber.

SUMMARY OF THE INVENTION

More particularly, according to the present invention there is provided a light emitting assembly to form a handgrip, a foot peg or a footrest in a cycle, the light emitting assembly including the combination of an elongated sleeve concentrically supported on a light conductive base, a radial end wall and a radial extending shoulder spaced apart on the light conductive base by a distance forming boundaries to at least one light emitting passage in the elongated sleeve for emitting light propagate by the light conductive base, fastening surfaces on light conductive base and to maintain the elongated sleeve concentrically supported on the light conductive base, at least one light emitting diode supported by the light conductive base for transmission of light along the length thereof, and a mounting fixture extending from the light conductive base beyond the radial extending shoulder onto to a frame of a cycle for forming a handgrip, a foot peg or a footrest.

According to one embodiment, the light emitting assembly further including a disk having the light emitting diode mounting thereon for support between the radial end wall and the light conductive base, the radial end wall being joined with an annular rim having an internal thread for interlocking engagement with an external thread on the light conductive base.

According to another embodiment, the light conductive base is further defined as an elongated cylinder having a plurality of light emitting diodes embedded in therein at spatially sites about the periphery thereof.

BRIEF DESCRIPTION OF THE SEVERAL VIEWS OF THE DRAWINGS

The present invention will be more fully understood when the following description is read in light of the accompanying drawings in which:

FIG. 9 is an isometric view of a throttle grip embodying a construction according to a second embodiment.

DETAILED DESCRIPTION OF THE INVENTION

Figure 1:
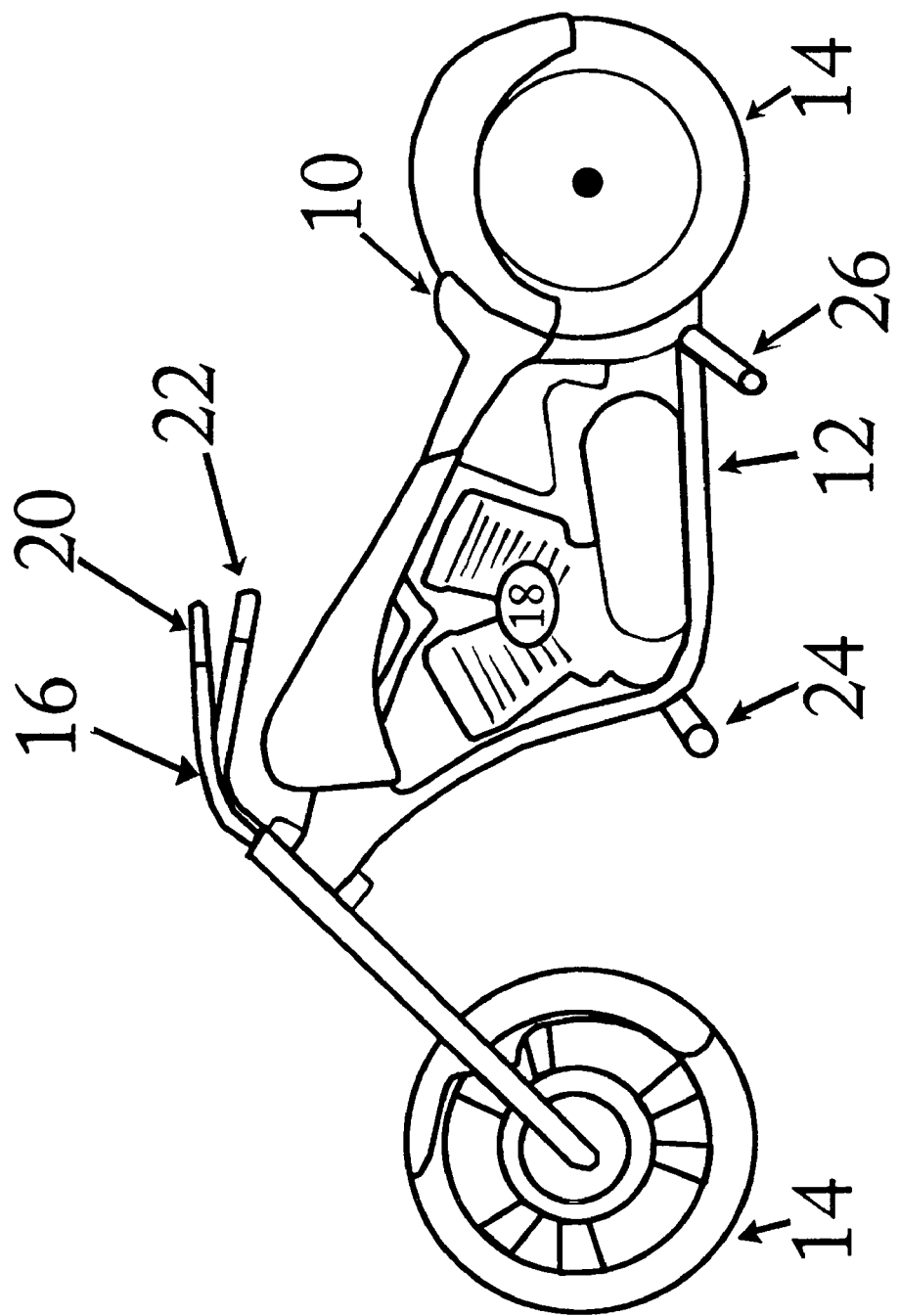
FIG. 1 is an isometric view of the cycle for use with the light emitting assembly according to the present invention.

FIG. 1 illustrates a typical cycle 10 having a frame 12 supported by spaced apart wheels 14 with the forward wheel coupled to a handlebar 16 containing the usual clutch and brake control levers for an internal combustion engine 18. The control levers overlie hand grips 20 and 22 of which grip 20 on the right side of the handle bar is a throttle grip and the grip 22 on the left side is a stationary grip. The cycle is also equipped with foot pegs 24 and foot rests 26 mounted in a cantilever fashion at each of opposite sides on the frame. The present invention seeks to provide sources of illumination dispersed about the frame of the cycle to serve visual identifiers and to provide facilities for decorative enhancements. Accordingly, the present invention provides light emitting assembly to form any or all of the handgrips 20 and 22, the foot pegs 24 and the footrests 26 in a cycle 10.

The light emitting assembly illustrated in FIGS. 2-7 includes an elongated sleeve 30 concentrically supported on a cylindrical outer peripheral surface 32A of the light conductive base 32. The sleeve 30 can be made of metal or plastic and when made of plastic material varying colors and tints can be incorporated in the plastic and the material can be etched, stained, engraved or painted. The light conductive base 32 is preferably made of plastic and may include varying colors and tints to enhance the appearance.

Figure 2:
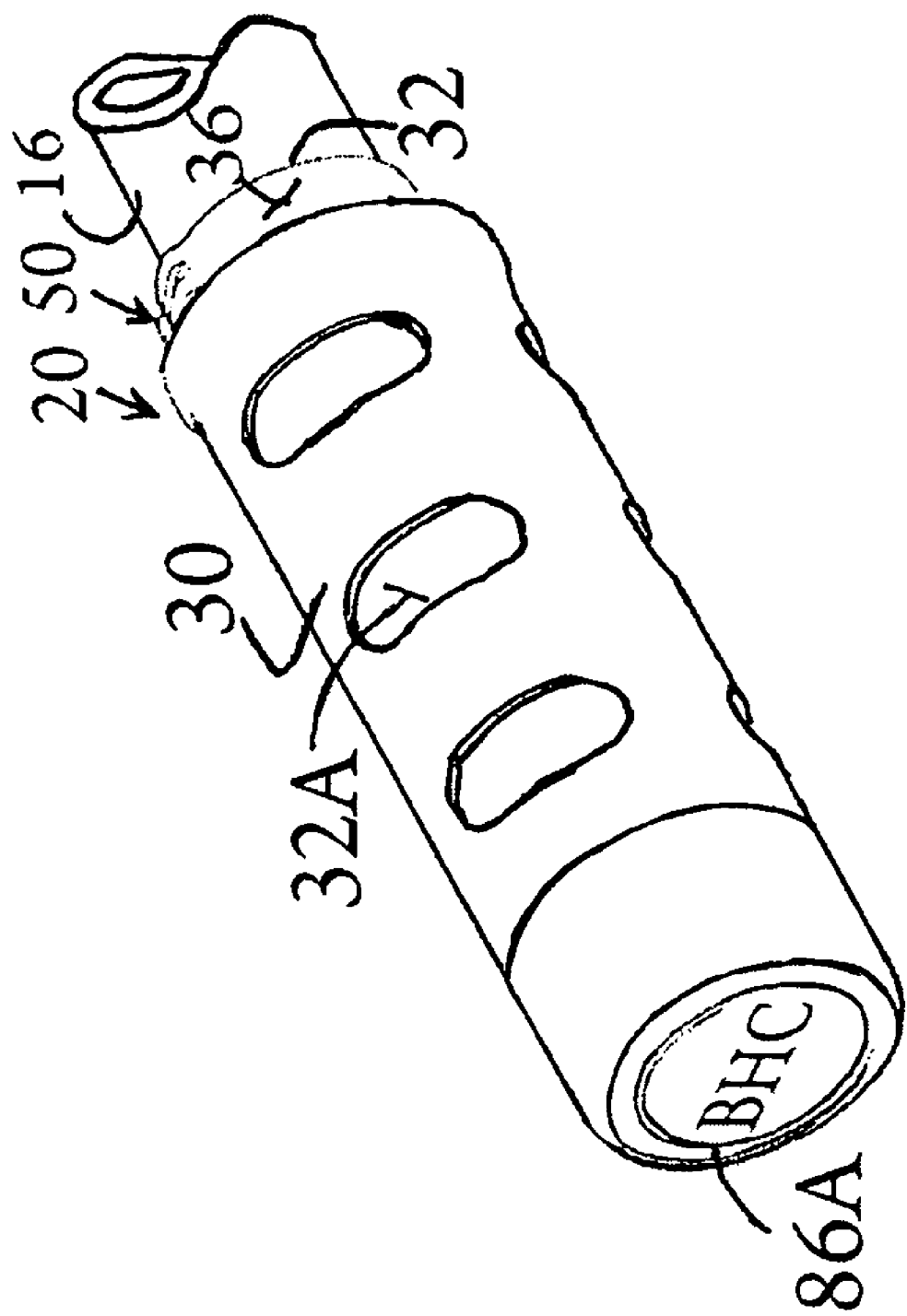
FIG. 2 is an isometric view of a throttle grip embodying the present invention.
Figure 3:
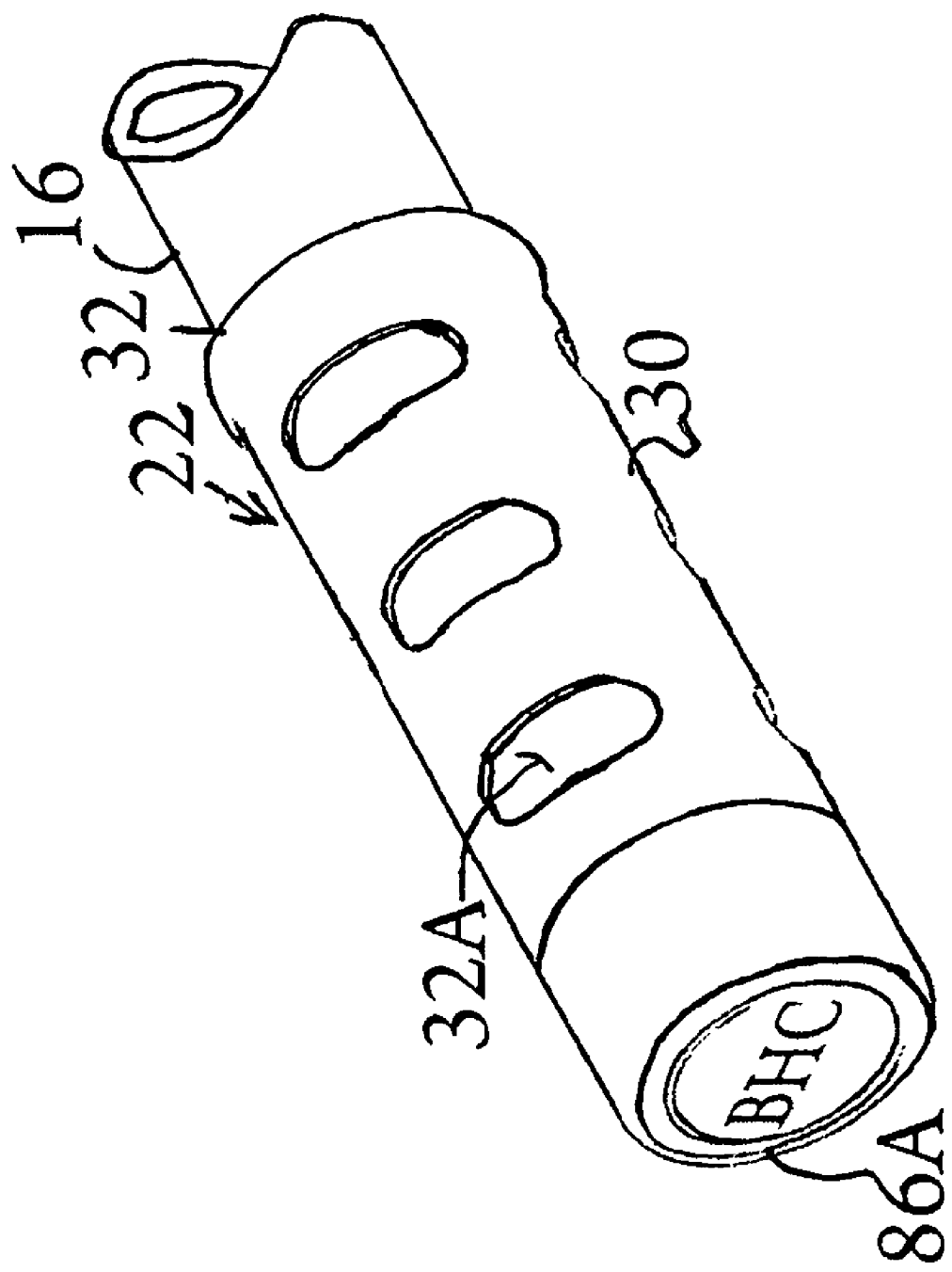
FIG. 3 is an isometric view of a stationary grip embodying the present invention.
Figure 4:
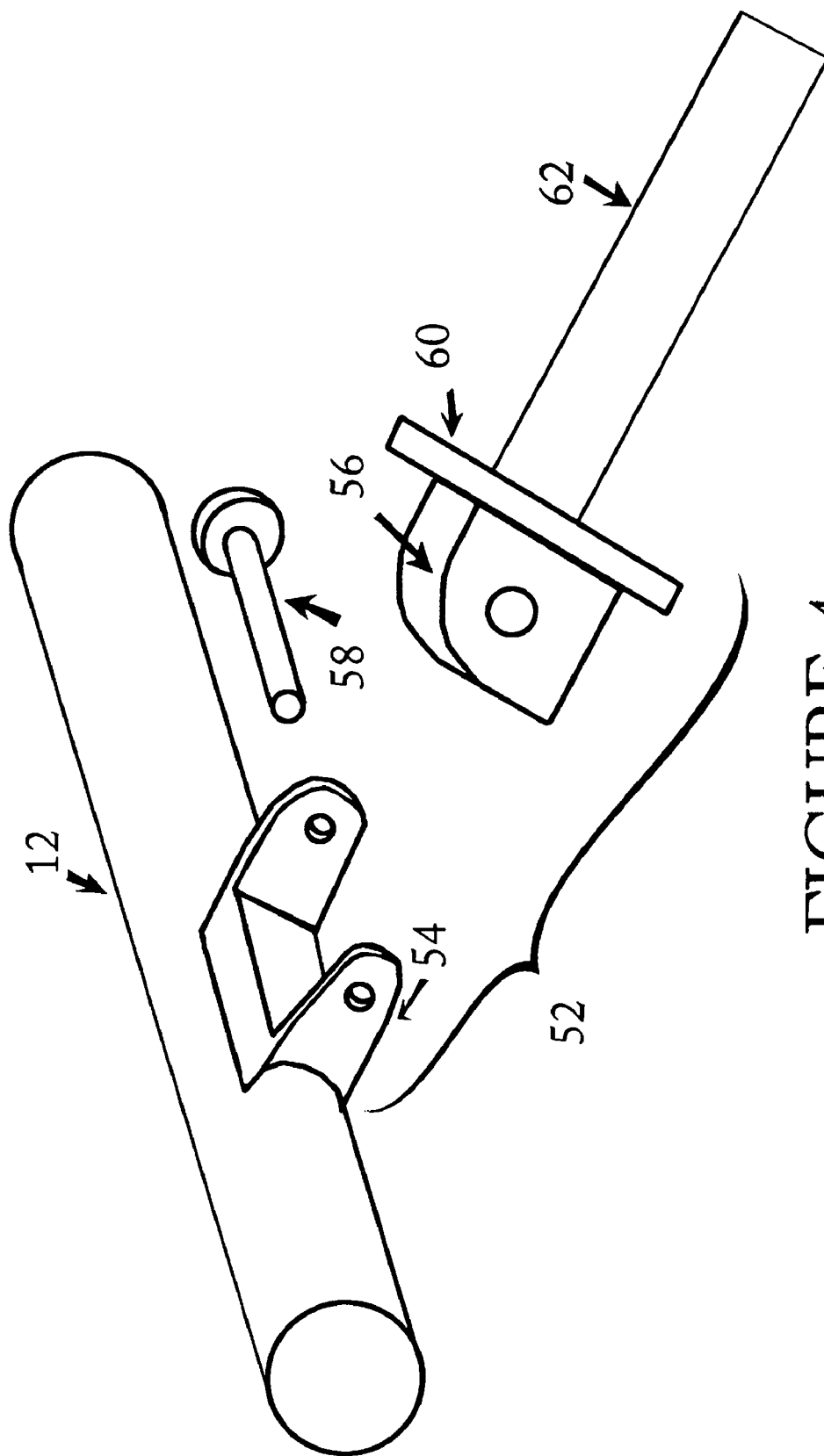
FIG. 4 is an exploded view of a foot peg and foot rest mounting for the light emitting assembly according to the present invention.
Figure 5:
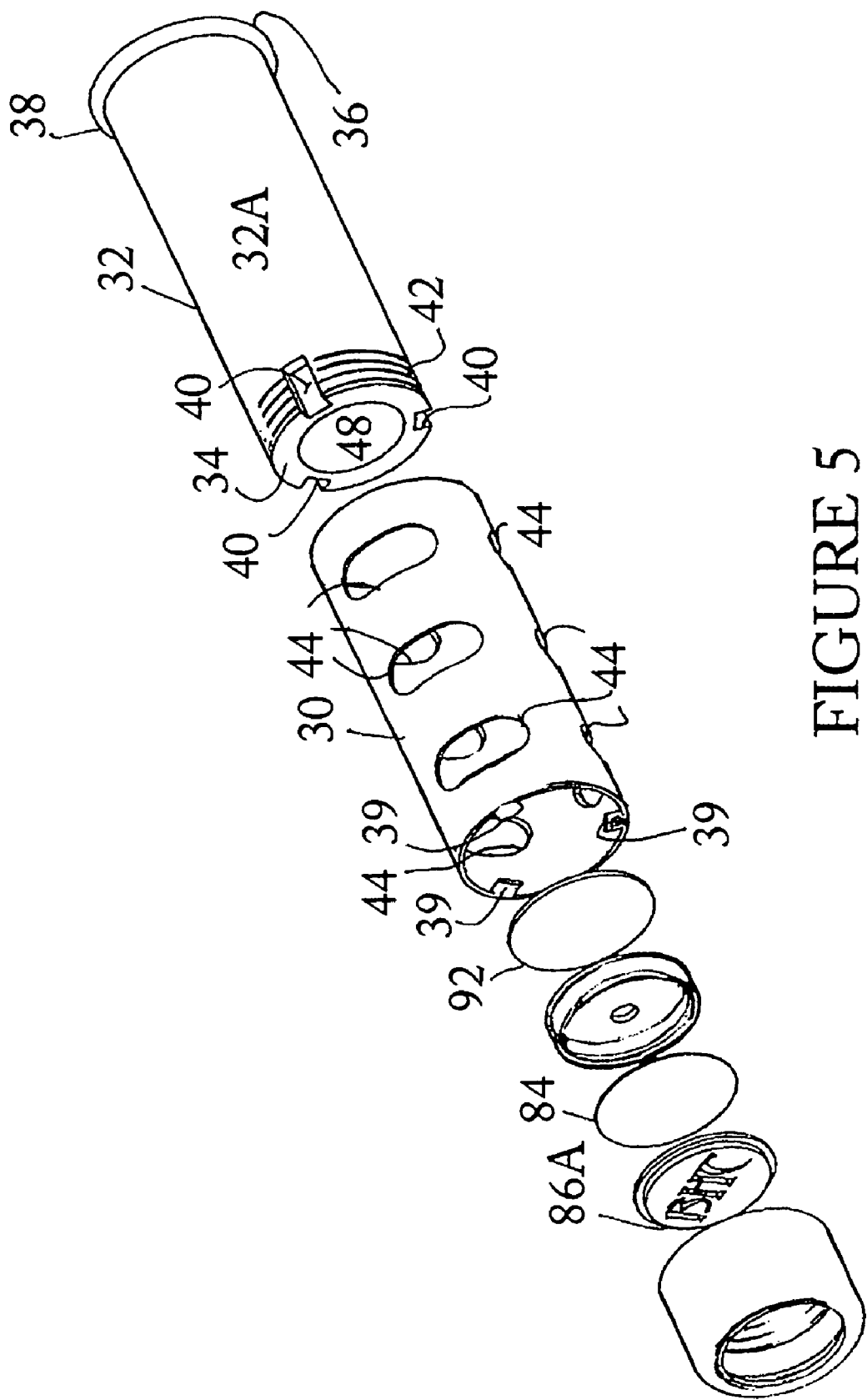
FIG. 5 is an exploded view of the stationary grip shown in FIG. 3.
Figure 6:
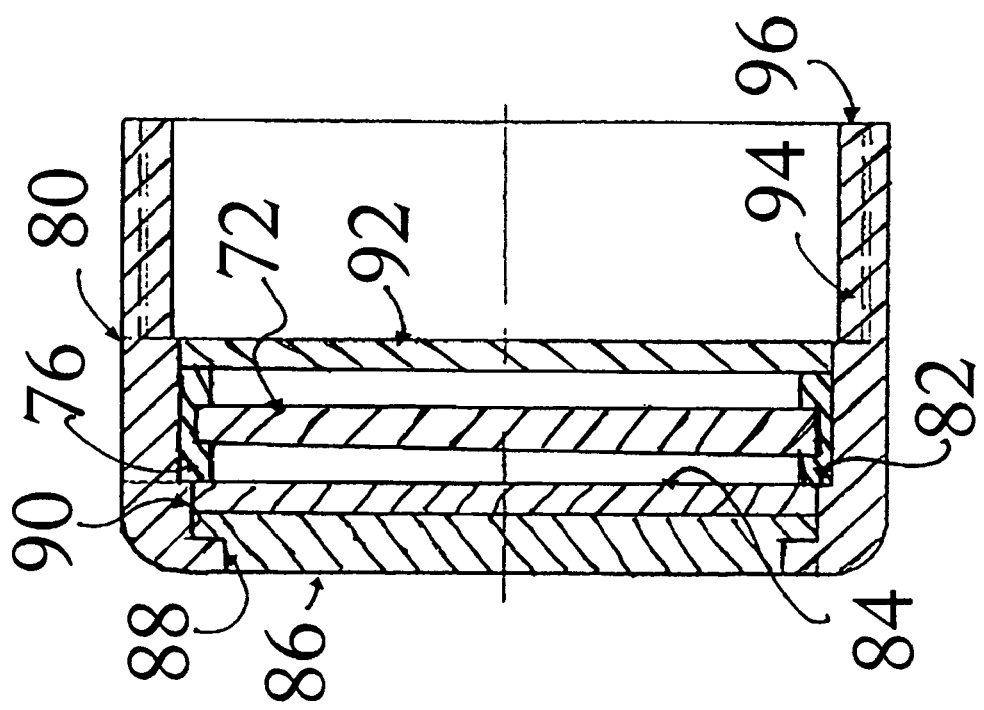
FIG. 6 is a sectional view taken along lines VI-VI of FIG. 5.

As shown in FIG. 5, the light conductive base 32 includes an outboard end wall 34 and an inboard end wall 36 having a radial extending flange 38 for abutted support of the one terminal ends of the sleeve 30. The opposite terminal end of the elongated sleeve 30 is formed with three equally spaced strip shaped locks 39 extending racially inward of the sleeve. The outboard end wall 34 contains three equally spaced key slots 40 extending to and intercept a length of thread 42 formed in an end portion of the outer cylindrical peripheral surface 32A of the light conductive base 32. The strip shaped locks 39 fit into the key slots 40 to prevent unwanted relative rotation of the elongated sleeve 30 on the light conductive base 32 and concentrically support the sleeve on the light conductive base. The elongated sleeve 30 has an array of light emitting apertures 44 which are spaced apart along the length of the sleeve at spaced sites about the periphery of the sleeve as shown in FIGS. 2-4. The configuration, number and type of the array of the light emitting apertures 44 illustrated in the drawings are examples of optional choices.

The light conductive base 32 has the form of a light conductive sleeve to provide a hollow interior cavity 48 for diverse purposes namely, additional dispersion of light, providing a conduit for electrical wiring, a receptacle for a tubular portion of a handle bar, to provide a throttle grip and a stationary grip and/or a mounting site for a mounting structure of a foot peg and a foot rest. Diverse forms of mounting fixtures extending from the light conductive base beyond the radial extending shoulder for mounting the light emitting assembly onto to a frame of a cycle for forming the handgrip, a foot peg or a footrest.

FIG. 2 illustrates the throttle grip 20 having one conventional form of a throttle cable mounting structure 50 projecting from the radial extending flange 32 of the inboard end wall 36 and containing an end portion of the handle bar 16. FIG. 3 illustrates a portion of a tubular handle bar 16 onto which is mounted the stationary handle grip 22. FIG. 4 illustrates one well known form of mounting fixture 52 for the foot peg 24 and foot rest 26. The structure 52 uses a clevis 54 welded to the frame 12 to receive a plate 56 inter locked by a clevis pin 58. The plate 56 is joined with a face plate 60 provided with a foot peg base 62 that is dimensioned to mount into the hollow interior cavity 48 of the light conductive base 32.

Figure 8:
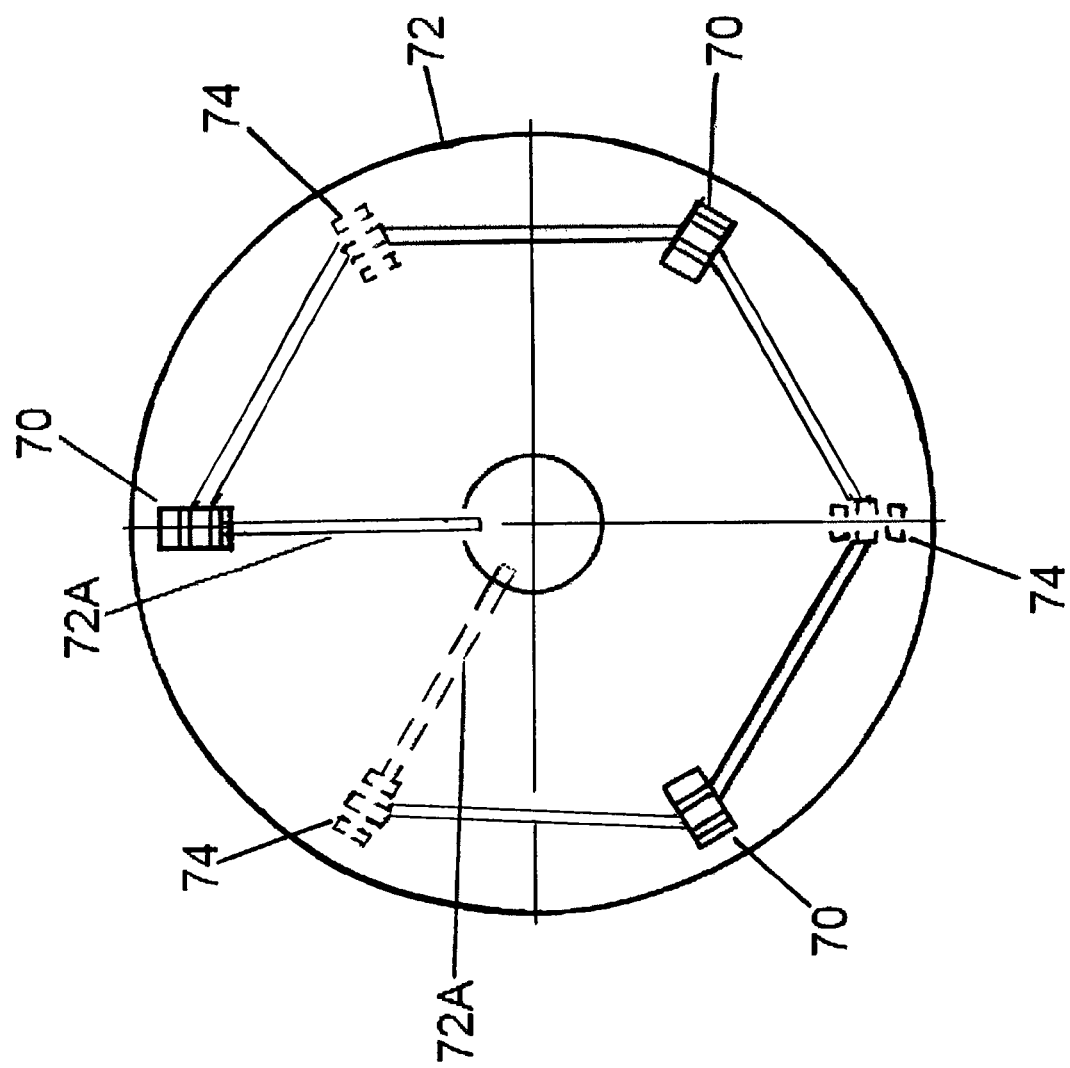
FIG. 8 is an isometric view of a support for light emitting diodes for part of the stationary grip shown in FIG. 5.

The light conductive sleeve of the light conductive base 32 receives light from a plurality of light emitting diodes. As shown in FIG. 8, three diodes 70 are mounted near the outer periphery on one face surface of a disk shaped circuit board 72 and three other light emitting diodes 74 are mounted near the outer periphery on the opposite face surface of the circuit board. Electrical supply wiring 72A extends from the circuit board along the hollow interior cavity 48 of the light conductive base 32 and then to a voltage supply site, not shown, on the cycle frame or handle bar depending on the support site for the light emitting assembly forming the handgrip, a foot peg or a footrest. Batteries can be utilized to power the light emitting diodes, thereby providing a measure of freedom in the design of the handlebars, hand grips and foot pegs. Different types of batteries can be used. For example, the traditional cylindrical batteries will fit into the hollow of the light conductive base or into the handle bars. The smaller battery such as a button cell will fit into the end cap. The color of the Individual LED utilized can be varied, from a uniform one-color scheme to a mixed-color design. Any of well known ON/OFF switches can be incorporated in the electrical system for the diodes and may comprise, for example, a switch located in the threaded end cap that could make and break contact with the battery by movement of the cap along the threaded connection. However, a centralized power switch is preferred when using the electrical power of the cycle.

Figure 7:
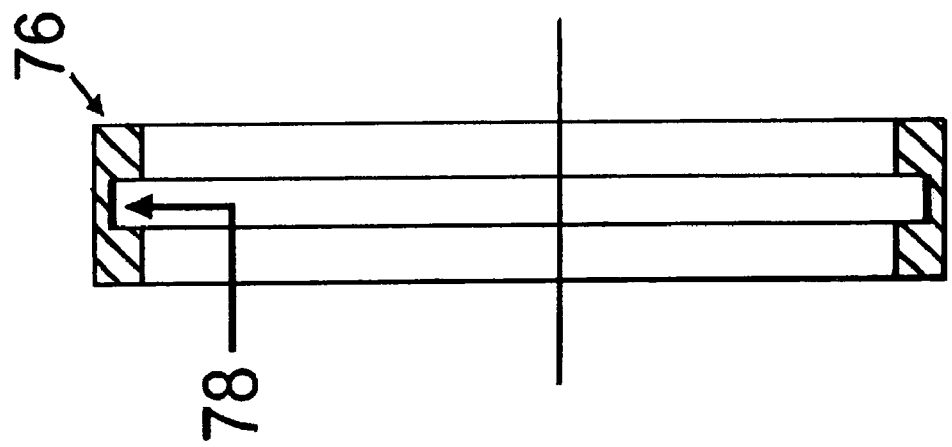
FIG. 7 is a sectional view taken along lines VII-VII of FIG. 5.

A resilient spacer sleeve 76, shown in FIG. 7, has an internal annular recess or grove 78 located between opposite sides to form a carrier ring to receive the outermost peripheral edge of the disk shaped circuit board 72. As shown in FIG. 5, the spacer sleeve 76 is supported in an end cap 80 with one lateral side in an abutting relation with both an internal shoulder 82 formed in the end cap and a light diffusion lens 84 that overlies an end piece 86 having a stepped peripheral edge seated in stepped recesses 88 and 90 located between one terminal end of the end cap and the internal shoulder 82. As shown in FIGS. 2, 3 and 4, the end piece 86 forms a radial end wall containing decorative openings 86A to receiving a transmission of light from an adjacent lens 84.

A second light diffusion lens 92 abuts against the exposed lateral side of the spacer sleeve 76. The final internal surface of the end cap 80 takes the form of an annular rim containing an internal thread 94 extending from the site of the second light diffusion lens 92 to the terminal end wall 96 of the cap which is opposite the recess 90. The thread 94 is interlocking engaged with the thread 42 formed in an end portion of the outer cylindrical peripheral surface 32A of the light conductive base 32. The thread 94 in the cap is advanced along the thread 42 of the light conductive base until mating engagement is established between the outboard end wall 34 and the terminal end wall 96. This arrangement of parts provides that the light diffusion lenses 84 and 92 disperse light from said light emitting diodes to the cylindrical wall of the light conductive base 32 for transmission along the extended length thereof.

FIG. 9 illustrates a second embodiment of a light conducting base 132 which differs from the light conducting base 32 by the formation of elongated grooves 134 extending longitudinal as radial spaced slots forming support sites about the outer periphery of the cylindrical base 132. A plurality of light emitting diodes 136 is embedded in each of the groves with the diodes in each grove at spaced apart positions along the elongated length of the cylindrically shaped periphery. In this embodiment, a circuit board is not needed for mounting the diodes since the diodes can be mounted in the plastic material forming the cylindrical base 132 and electrically interconnected by lead wiring that extends to an electrical current supply site on the cycle. The cylindrical base 132 supports the sleeve 30 to extend between the inboard end wall 36 by abutting with the radial extending flange 38 and extending to the three equally spaced strip shaped locks 39. The outboard end wall 34 contains the three equally spaced key slots 40 and the end cap 80 is thread onto the thread 42. The end cap is foreshortened by eliminating the resilient spacer sleeve 76 and the support site in the end cap.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A light emitting assembly to form a handgrip, a foot peg or a footrest in a cycle, said light emitting assembly including the combination of:

a light conductive base having a cylindrical outer peripheral surface;

an elongated sleeve concentrically supported on and around the cylindrical outer peripheral surface of said light conductive base;

a radial end wall and a radial extending shoulder spaced apart on said light conductive base by a distance forming boundaries to at least one light emitting passage in said elongated sleeve for emitting light propagated by said light conductive base;

fastening surfaces on said light conductive base for maintaining said elongated sleeve concentrically supported on said cylindrical outer peripheral surface of said light conductive base;

at least one light emitting diode supported by said light conductive base for transmission of light along the length thereof; and a mounting fixture extending from said light conductive base beyond said radial extending shoulder onto a frame of a cycle for forming a handgrip, a foot peg or a footrest.

2. The light emitting assembly according to claim 1 wherein said radial end wall is joined with an annular rim having an internal thread for interlocking engagement with an external thread on said light conductive base.

3. The light emitting assembly according to claim 2 wherein said elongated sleeve and said light conductive base includes at least one interlocking key and key slot for preventing relative rotation there between.

4. The light emitting assembly according to claim 2 further including a disk having said at least one light emitting diode mounting thereon for support between said radial end wall and said light conductive base.

5. The light emitting assembly according to claim 4 further including a carrier ring receiving said disk for mounting within said annular rim.

6. The light emitting assembly according to claim 5,
wherein said carrier ring has an internal annular recess between opposite ends for receiving said disk, and wherein said light emitting assembly further includes a lens at opposite ends of said carrier ring for controlling dispersion of light from said light emitting diode.

7. The light emitting assembly according to claim 6 wherein said radial end wall has decorative openings receiving transmission of light from an adjacent one of said lens.

8. The light emitting assembly according to claim 1 wherein said at least one light emitting diode comprises a plurality of light emitting diodes and wherein said light conductive base is further defined as an elongated cylinder having said plurality of light emitting diodes embedded in said elongated cylinder at spatial sites about the periphery thereof.

9. The light emitting assembly according to claim 1 wherein said at least one light emitting diode comprises a plurality of light emitting diodes and wherein said light conductive base is further defined as an elongated hollow cylinder having said plurality of light emitting diodes arranged in spaced apart positions within longitudinal slots in the outer periphery of said elongated hollow cylinder, and wherein the hollow of said elongated hollow cylinder provides passages for electrical leads to power said plurality of light emitting diodes.

10. A light emitting assembly to form a handgrip, a foot peg or a footrest in a cycle, said light emitting assembly including the combination of:

an elongated sleeve concentrically supported on a light conductive base;

a radial end wall and a radial extending shoulder spaced apart on said light conductive base by a distance forming boundaries to at least one light emitting passage in said elongated sleeve for emitting light propagated by said light conductive base;

fastening surfaces on said light conductive base to maintain said elongated sleeve concentrically supported on said light conductive base;

at least one light emitting diode supported by said light conductive base for transmission of light along the length thereof; and a mounting fixture extending from said light conductive base beyond said radial extending shoulder onto to a frame of a cycle for forming a handgrip, a foot peg or a footrest;

wherein said radial end wall is joined with an annular rim having an internal thread for interlocking engagement with an external thread on said light conductive base;

wherein the light emitting assembly further includes a disk having said at least one light emitting diode mounting thereon for support between said radial end wall and said light conductive base and a carrier ring receiving said disk for mounting within said annular rim;

wherein said carrier ring has an internal annular recess between opposite ends for receiving said disk, and wherein said light emitting assembly further includes a lens at opposite ends of said carrier ring for controlling dispersion of light from said light emitting diode.

11. The light emitting assembly according to claim 10 wherein said radial end wall has decorative openings receiving transmission of light from an adjacent one of said lens.

12. A light emitting assembly to form a handgrip, a foot peg or a footrest in a cycle, said light emitting assembly comprising:

a light conductive base;

an elongated sleeve concentrically supported on said light conductive base;

a radial end wall and a radial extending shoulder spaced apart on said light conductive base by a distance forming boundaries to at least one light emitting passage in said elongated sleeve for emitting light propagated by said light conductive base;

fastening surfaces on said light conductive base for maintaining said elongated sleeve concentrically supported on said light conductive base;

at least one light emitting diode supported by and located at said radial end wall of said light conductive base and at the end of the elongated sleeve for transmission of light along the length of said light conductive base and said elongated sleeve and for the transmission of light from the end of said light conductive base and said elongated sleeve of the light emitting assembly; and a mounting fixture extending from said light conductive base beyond said radial extending shoulder onto a frame of a cycle for forming a handgrip, a foot peg or a footrest.

* * * * *